United States Patent
Sukhija et al.

(10) Patent No.: US 10,901,818 B2
(45) Date of Patent: *Jan. 26, 2021

(54) SYSTEM AND METHOD FOR COMMON REQUEST PROCESSING

(71) Applicant: Visa International Service Association, San Francisco, CA (US)

(72) Inventors: Rohit Sukhija, Bangalore (IN); Man Grace Wu, San Francisco, CA (US); Jan Tore Klepp, Burlingame, CA (US); Rajiv Dutta, Palo Alto, CA (US); Ghanshyam Rokde, Fremont, CA (US); Soorej Nair, San Jose, CA (US); Uma Srinivasan, Foster City, CA (US); Nathan Morgan, Georgetown, TX (US); Sanjib Sengupta, Dublin, CA (US); Palaniappan Kathiresan, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/457,601

(22) Filed: Jun. 28, 2019

(65) Prior Publication Data

US 2020/0409775 A1 Dec. 31, 2020

Related U.S. Application Data

(63) Continuation of application No. 15/355,453, filed on Nov. 18, 2016, now Pat. No. 10,387,146.

(60) Provisional application No. 62/261,079, filed on Nov. 30, 2015, provisional application No. 62/280,634, filed on Jan. 19, 2016.

(51) Int. Cl.
*G06F 9/54* (2006.01)

(52) U.S. Cl.
CPC .............. *G06F 9/546* (2013.01); *G06F 9/541* (2013.01)

(58) Field of Classification Search
CPC .............. H04L 67/2823; G06F 9/5027; G06F 2209/5013
See application file for complete search history.

(56) References Cited

U.S. PATENT DOCUMENTS

| | | |
|---|---|---|
| 5,933,584 A | 8/1999 | Maniwa |
| 5,987,126 A | 11/1999 | Okuyama et al. |
| 7,693,962 B2 | 4/2010 | Serlet et al. |
| 8,972,543 B1 | 3/2015 | Park |

(Continued)

OTHER PUBLICATIONS

U.S. Appl. 15/355,453, "Non-Final Office Action", dated Sep. 14, 2018, 12 pages.

(Continued)

*Primary Examiner* — Charles E Anya
(74) *Attorney, Agent, or Firm* — Kilpatrick Townsend & Stockton LLP

(57) ABSTRACT

Embodiments of the invention are directed to systems and methods for common request processing by a request formatting platform. The request formatting platform generates formatted requests for request processors according to specifications of a common request processing application programming interface (API). The same common request processing API is used by the request formatting platform to communicate with all of the request processors according to one particular format.

20 Claims, 13 Drawing Sheets

(56) References Cited

U.S. PATENT DOCUMENTS

| | | | |
|---|---|---|---|
| 9,405,813 B1 | 8/2016 | Qian et al. | |
| 9,798,769 B2 | 10/2017 | Meyers et al. | |
| 2003/0036972 A1 | 2/2003 | Zamma et al. | |
| 2008/0250434 A1* | 10/2008 | Ho | G06F 9/5027 719/329 |
| 2011/0066672 A1* | 3/2011 | Zamarreno | G06F 9/466 709/203 |
| 2014/0372315 A1* | 12/2014 | Faith | G06Q 20/02 705/44 |
| 2015/0365487 A1 | 12/2015 | Mitchell et al. | |
| 2017/0041394 A1 | 2/2017 | Mortazavi et al. | |
| 2017/0155743 A1 | 6/2017 | Sukhija et al. | |

OTHER PUBLICATIONS

U.S. Appl. No. 15/355,453, "Corrected Notice of Allowability", dated Jul. 11, 2019, 5 pages.
U.S. Appl. No. 15/355,453, "Non-Final Office Action", dated Sep. 14, 2018, 12 pages.
U.S. Appl. No. 15/355,453, "Notice of Allowance", dated Mar. 27, 2019, 9 pages.

* cited by examiner

SYSTEM AND METHOD FOR COMMON REQUEST PROCESSING

CROSS-REFERENCES TO RELATED APPLICATIONS

The present application is a continuation of U.S. patent application Ser. No. 15/355,453 filed on Nov. 18, 2016, which claims the benefit of U.S. Provisional Patent Application No. 62/261,079, filed Nov. 30, 2015, and U.S. Provisional Patent Application No. 62/280,634, filed Jan. 19, 2016, the disclosures of which are hereby incorporated by reference in their entireties.

BACKGROUND

Conventionally, request messages from client systems to processors may be sent through an intermediary server. The intermediary server may receive request messages from the client systems in a format particular to each respective client system. Each request message may identify a particular processor to process the request. To effectively communicate the request message to the particular processor, the intermediary server may have to reformat the request message from the format used by the client system into a format used by the particular processor. In other words, the intermediary server must know how to communicate with both the client system and the processor according to their particular formats.

On a large scale, such processing and reformatting of request messages is cumbersome, inefficient and expensive. For example, the intermediary server may wish to communicate with thousands of different client systems, each communicating in its own respective format, and hundreds of different processors, each communicating in a different format. It may be desirable for the intermediary server to be capable of communicating with as many different processors as possible, as they may each offer different combinations of request processing services to the client systems. Thus, the intermediary server must be capable of translating request messages across millions of client system-processor combinations.

To achieve this, the intermediary server must invest heavily in building, upgrading and maintaining connections with hundreds of different processors around the world. Each connection requires product development, quality assurance and product operations effort. These connections are not scalable because all of the processors have their own technical and functional specifications that the intermediary server must build to. This hinders the intermediary server from scaling up because each connection requires effort and investment.

SUMMARY

Thus, there is a need for new and enhanced systems and methods of translating request messages that reduces processing power while improving efficiency. Embodiments of the invention can address these and other problems, individually and collectively.

Embodiments of the invention are directed to systems and methods for common request processing by a request formatting platform. The request formatting platform generates formatted requests for request processors according to specifications of a common request processing application programming interface (API). The same common request processing API is used by the request formatting platform to communicate with all of the request processors according to one particular format.

One embodiment of the invention is directed to a method comprising receiving, by a server computer, a plurality of requests, each request of the plurality of requests being received from a respective requesting system of a plurality of requesting systems and specified for a respective request processor of a plurality of request processors. The method further comprises formatting, by the server computer, the plurality of requests into a plurality of formatted requests according to specifications of a common request processing application programming interface (API). The common request processing API is implemented by the plurality of request processors. The method further comprises sending, by the server computer, each formatted request of the plurality of formatted requests to the respective request processor. The respective request processor processes the formatted request using the common request processing API and generates a response according to the specifications of the common request processing API. The method further comprises receiving, by the server computer, the response from the respective request processor, and sending, by the server computer, the response.

Another embodiment of the invention is directed to a server computer comprising a processor and memory coupled to the processor. The memory stores instructions, which when executed by the processor, cause the server computer to perform operations including the steps of the above method.

These and other embodiments of the invention are described in further detail below.

DETAILED DESCRIPTION

Figure 1:
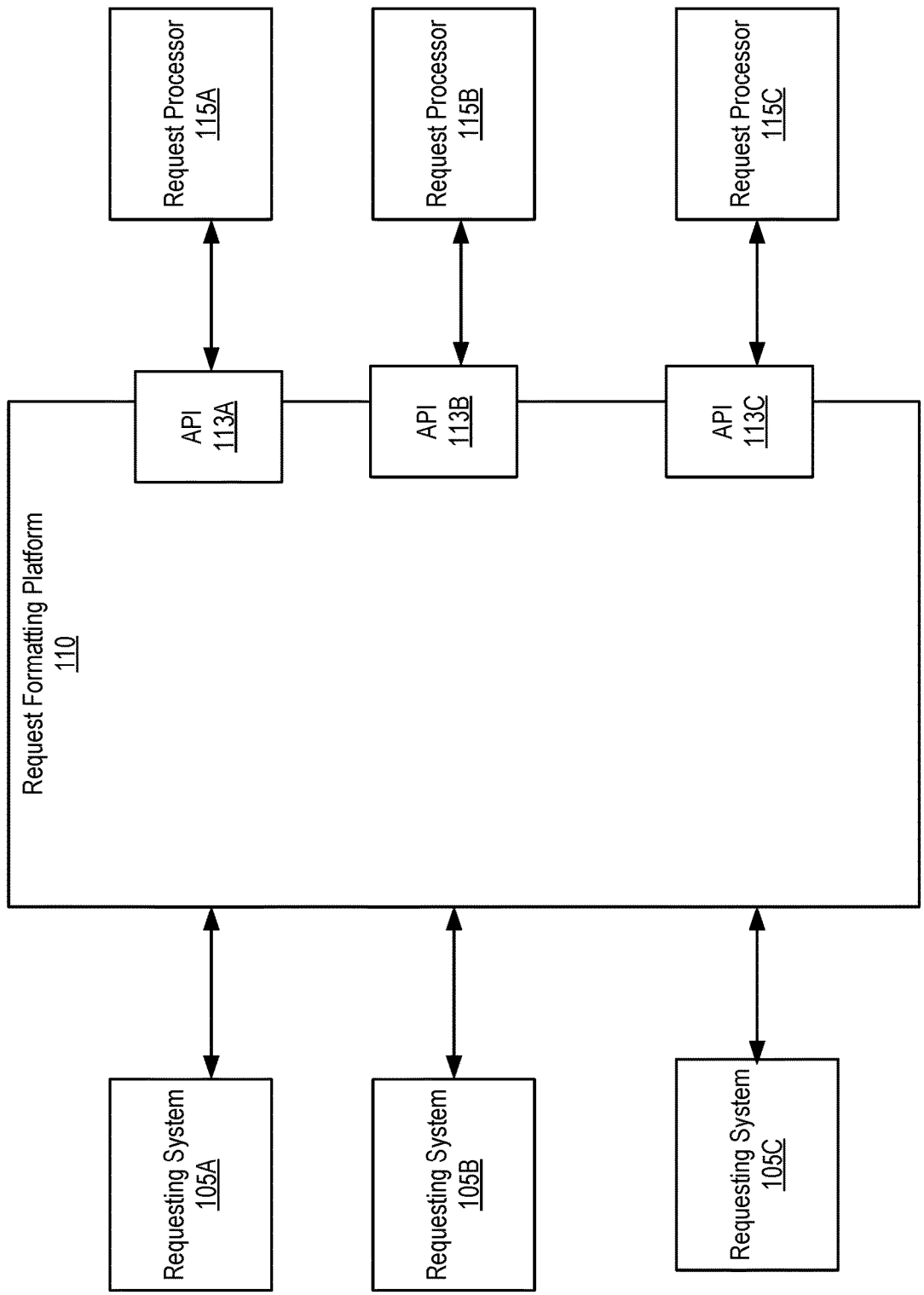
FIG. 1 shows a block diagram depicting a system for processing requests using processor-specific APIs according to an embodiment of the present invention.

Embodiments of the invention are directed to systems and methods for common request processing by a request formatting platform. The request formatting platform receives requests from a plurality of requesting systems, each communicating requests in its own format, and translates the requests into formatted requests for specified request processors. The formatted requests are generated according to specifications of a common request processing application programming interface (API). The same common request processing API is used by the request formatting platform to communicate with all of the request processors according to one particular format.

Advantageously, embodiments of the invention allow the request formatting platform to "scale out" by rapidly building connections to new and existing request processors, improving time-to-market. In addition, embodiments of the invention allow the request formatting platform to remain relevant by quickly offering new and existing services from request processors to requesting systems. These advantages are achieved by implementing the same common request processing API used by the request formatting platform on each of the request processors, instead of building individual connections from the request formatting platform to each request processor.

Prior to discussing specific embodiments of the invention, some terms may be described in detail.

An "application programming interface" or "API" may be a set of definitions, protocols, and tools for building and maintaining software and applications. An API may be for a server computer, a network-based system, an operating system, a database system, computer hardware, and/or computer software. A "common request processing API" may be any API configured to process requests (e.g., format requests, act on requests, respond to requests, etc.) that is common amongst multiple entities. For example, a common request processing API may be implemented by a request formatting platform that receives and formats requests, as well as by multiple request processors that receive, act on, and respond to formatted requests, such that the request formatting platform may communicate similarly (e.g., in a similar format) with the multiple request processors.

"Fields" may refer to divisible sets of data in fixed or known locations. For example, a message may include one or more different fields. Each field may have a type and/or a location. A type of a field may be, for example, an identifier for a requesting system, whereas the field may include "Resource_Provider_A". A location of the field may be, for example, the first field at the beginning of a message. The field may be parsable due to its known location. A field may be of fixed or variable length. If a field has fixed length, the field will be easily parsable as it always has a particular number of characters. In some embodiments, leading zeroes (or another value) may be added to a field to make it the proper fixed length. If a field has a variable length, the field may be parsable from other fields in a message through the use of a separator (e.g., one or more spaces, one or more punctuation marks, or any other characters).

A "format" may refer to an arrangement, organization, size, shape, and/or makeup of something. For example, a format of a message may include a number of fields in the message, sizes of fields in the message, types of fields in the message, location (e.g., arrangement) of fields in the message, spacing between fields and in other locations of the message, and/or punctuation in and between fields and in other locations of the message.

An "identifier" may refer to any combination of letters, numbers, and/or symbols used to uniquely identify something. An identifier may be assigned randomly, consecutively, or according to any pattern or algorithm. In some embodiments, a requesting system may be associated with an identifier that may be used to identify the requesting system to a request formatting platform.

A "request" may be any message sent between entities. A request may originate from one entity and be sent to another entity to ask for something. In some embodiments, a request may ask for information, data, action, inaction, services, applications, and the like. A request may be transmitted by any suitable method, such as, for example, over a network. A request may include any combinations of letters, numbers, and/or symbols that may be interpreted by the receiving entity. In some embodiments, a request may be encrypted, hashed, encoded, or otherwise obfuscated. A request may include, for example, an API call. A request may have any format. A "formatted request" may be a request that has been converted into a particular format.

A "request processor" may be an entity (e.g., a system or server computer) that includes one or more electronic components that can process requests received from another entity (e.g., system, device or server computer). For example, a request processor can be a computing device that includes at least one processor coupled to a memory that stores instructions or code for execution by the processor. A request processor may provide remote communication capabilities to a network. A request processor can be configured to transmit and receive data or communications to and from other devices. In some examples, a request processor may be or be operated by a service provider.

A "requesting system" may be an entity (e.g., system or device) that includes one or more electronic components (e.g., an integrated chip) that can communicate requests to another entity (e.g., system, device or server computer). For example, a requesting system can be a computing device that includes at least one processor coupled to a memory that stores instructions or code for execution by the processor. A requesting system may provide remote communication capabilities to a network. A requesting system can be configured to transmit and receive data or communications to and from other devices. A requesting system may be in the form of a computer, an access device (e.g., a point of sale device), a mobile device such as a mobile phone (e.g., smart phone, cellular phone, etc.), tablets, portable media player, personal digital assistant devices (PDAs), wearable computing device (e.g., watch), health monitoring device, electronic reader device (e.g., a card reader device), an Internet-of-Things (IoT) device, etc., or in the form of a card (e.g., smart card) or a fob, etc. Examples of requesting systems may also include portable computing devices (e.g., laptops, netbooks, ultrabooks, etc.). A requesting system may also be in the form of a vehicle (e.g., an automobile), or be integrated as part of a vehicle (e.g., an infosystem of a vehicle).

A "resource" may be any tangible or intangible asset. Exemplary resources include money, labor, data, software, goods, information, services, and the like.

A "response" may be any message sent between entities. A response may originate from one entity and be sent to another entity to provide an answer, outcome, or reaction to a request, although every request does not necessarily need or have a response. A response may be transmitted by any suitable method, such as, for example, over a network. In some embodiments, a response may include information, notifications, reports, data, action, inaction, services, applications, and the like. A response may include any combinations of letters, numbers, and/or symbols that may be interpreted by the receiving entity. In some embodiments, a response may be encrypted, hashed, encoded, or otherwise obfuscated. A response may have any format. A "formatted response" may be a response that has been generated in a particular format.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. A request formatting platform may be an example of a server computer.

"Specifications" may include one or more requirements and/or details of something. In some embodiments, specifications for an application programming interface (API) may include requirements for routines, data structures, object classes, variables, and/or remote calls. For example, specifications for an API may specify that a particular routine be run on requests to generate formatted requests. In another example, specifications for an API may specify a particular structure or format to be used in generating a response to a formatted request.

I. Processor-Specific Request Processing

Messaging is the process of delivering any type of data from a sender to a recipient. The data may contain any information that needs to be communicated to the recipient. Messaging may occur over a network, for example, to transmit data to a remote party. A message may include a request from a sender to a recipient. The request may ask the recipient to take some action or inaction on behalf of the sender, for example.

FIG. 1 illustrates a block diagram of a system for processing requests using processor-specific APIs according to an embodiment of the present invention. FIG. 1 illustrates requesting systems 105A-C (e.g., request senders), a request formatting platform 110, and request processors 115A-C (e.g., request recipients). Requesting systems 105A-C may wish to transmit requests to one or more request processors 115A-C. However, requesting systems 105A-C may not know the particular communication protocols used by request processors 115A-C. Further, it may be prohibitive for requesting systems 105A-C to learn the particular communication protocols used by request processors 115A-C, as there may be numerous different protocols used that may require specific build-outs of software and/or hardware for each different protocol.

Thus, requesting systems 105A-C may instead transmit requests to a request formatting platform 110. The requests may specify one or more of request processors 115A-C as intended recipients of the requests. The requests may further include identifiers of the originating requesting systems 105A-C (e.g., requesting system 105A), such that responses to the requests, if needed, may be properly routed back to the proper originating requesting system 105A-C. Request formatting platform 110 may be in a better position to know and apply different communication protocols for different request processors 115A-C, as it may implement each build-out to each request processor 115A-C centrally and only once for a plurality of requesting systems 105A-C.

Request formatting platform 110 receives the requests from requesting systems 105A-C, and determines which of request processors 115A-C are specified as intended recipients. Request formatting platform 110 then implements APIs 113A-C to place the requests in the proper format for request processors 115A-C, respectively, depending on the intended recipient. For example, request formatting platform 110 may receive a request from requesting system 105A intended for request processor 115B. Request formatting platform 110 retrieves and applies API 113B to convert the request into a request formatted specifically for request processor 115B. Request formatting platform 110 then sends the formatted request to request processor 115B. Each of APIs 113A-C may be different depending on the different format requirements of request processors 115A-C.

Thus, request formatting platform 110 must know and apply a plurality of different APIs 113A-C for a plurality of different request processors 115A-C. It may be difficult, inefficient, or costly for request formatting platform 110 to build out to a large number of requesting processors 115A-C. Although shown and described as having three requesting systems 105A-C, three APIs 113A-C, and three requesting processors 115A-C, it is contemplated that any number (e.g., hundreds or even thousands) of requesting systems and requesting processors may wish to interface with requesting formatting platform 110.

II. Common Request Processing

Embodiments of the present invention may implement a single common request processing API to communicate with multiple request processors 115A-C. Thus, individual connections and APIs do not have to be built and implemented between request formatting platform 110 and request processors 115A-C.

A. Systems

Figure 2:
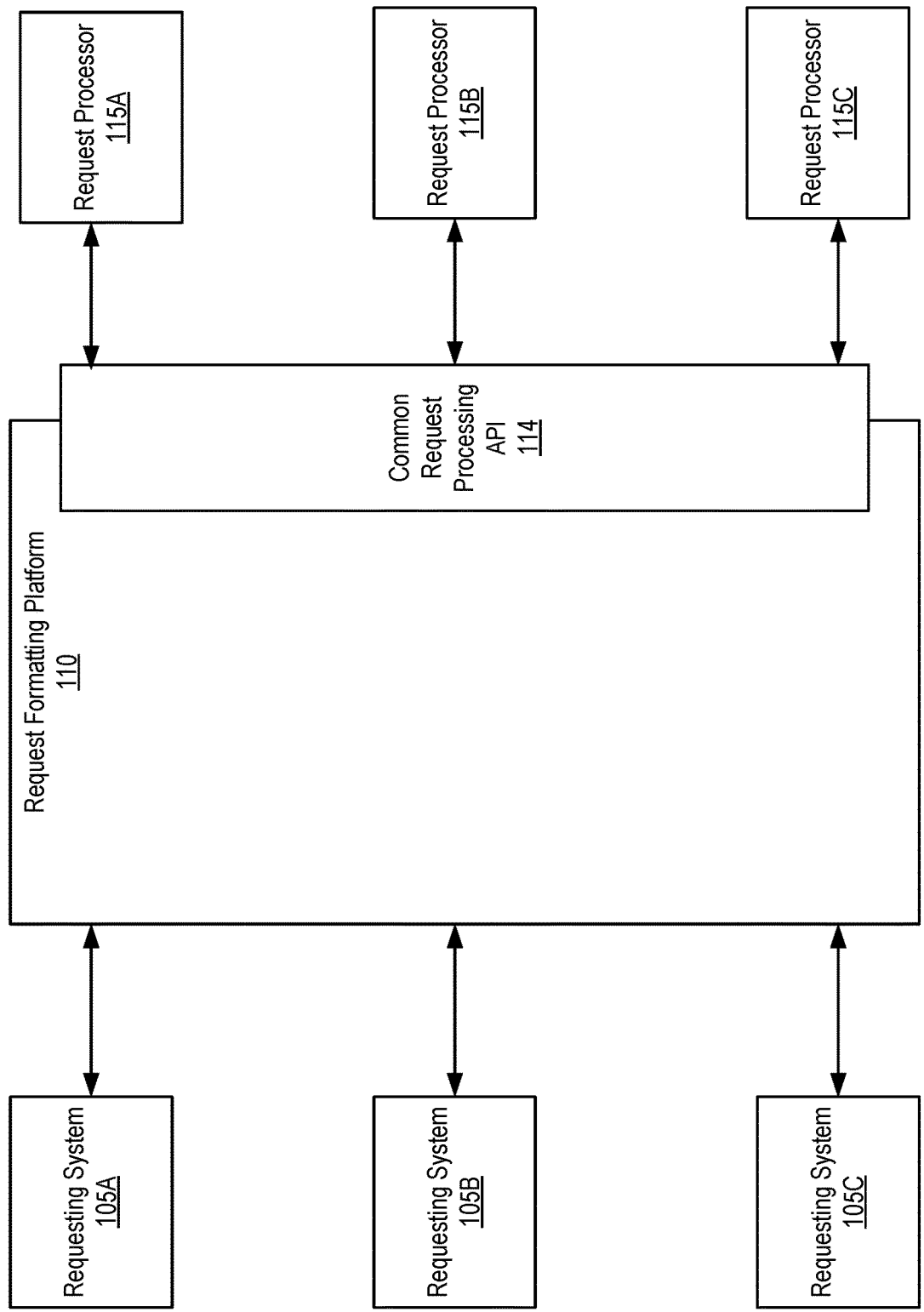
FIG. 2 shows a block diagram depicting a system for processing requests using a common request processing API according to an embodiment of the present invention.

FIG. 2 is a block diagram illustrating a system for processing requests using a common request processing API 114 according to an embodiment of the present invention. FIG. 2 similarly illustrates requesting systems 105A-C, a request formatting platform 110, and request processors 115A-C. Requesting systems 105A-C may wish to transmit requests to request processors 115A-C via request formatting platform 110.

Request formatting platform 110 receives the requests from requesting systems 105A-C. The requests may include identifiers of the requesting systems 105A-C. In some embodiments, the identifiers may be used to retrieve an initial format for the request. The initial format may be specific to a particular requesting system, i.e., requesting system 105A may use one initial format for its requests, requesting system 105B may use another, different initial format for its requests, and requesting system 105C may use a third, different initial format for its requests. In other embodiments, the initial format may be common to some or all of requesting systems 105A-C. Once the initial format is retrieved, the request may be parsed into fields.

Request formatting platform 110 then implements a common request processing API 114 to place the parsed fields into corresponding fields of a formatted request suitable for transmission to any one of request processors 115A-C. In other words, the formatted request is formatted similarly regardless of the intended recipient of the message. For example, request formatting platform 110 may receive a request from requesting system 105B intended for request processor 115C. Request formatting platform 110 applies common request processing API 114 to convert the request into a commonly formatted request. Request formatting platform 110 then sends the formatted request to request processor 115C. Similarly, request formatting platform 110 may receive a different request from requesting system 105C intended for request processor 115A. Request formatting platform 110 applies common request processing API 114 to convert the request into a commonly formatted request. Request formatting platform 110 then sends the formatted request to request processor 115A. At any time, request processors 115A-C may send a response to the request. The response may be intended for request formatting platform 110, the originating requesting system 105A-C, or another entity.

Thus, request formatting platform 110 must know and apply only one common request processing API 114 for a plurality of different request processors 115A-C. This allows request formatting platform 110 to easily and quickly "scale out" to a large number of request processors 115A-C. Request formatting platform 110 does not need to build individual connections to each request processor 115A-C.

Figure 3:
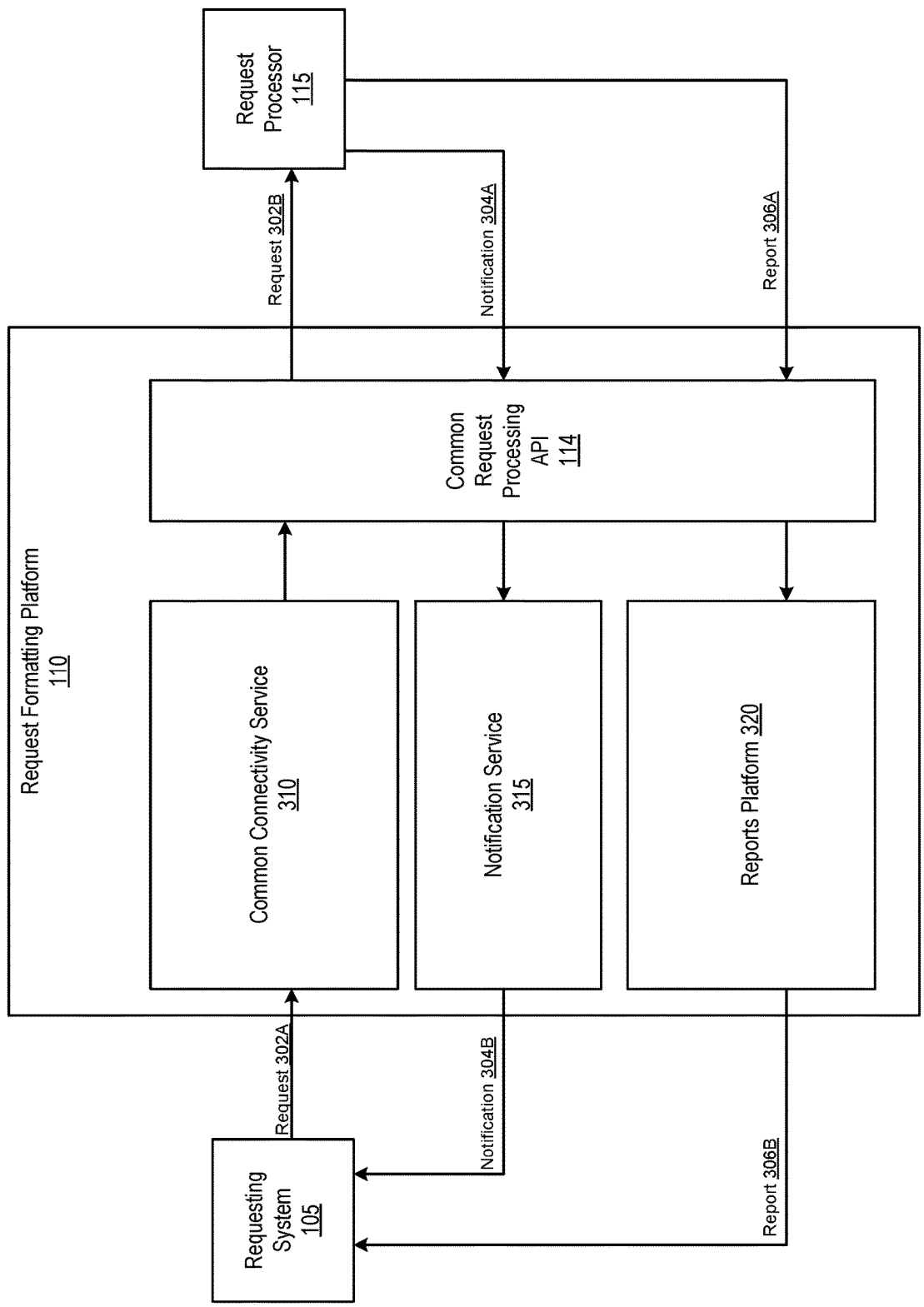
FIG. 3 shows a block diagram depicting a system implementing a common request processing API according to an embodiment of the present invention.

FIG. 3 is a block diagram illustrating a system implementing a common request processing API 114 according to an embodiment of the present invention. FIG. 3 illustrates requesting system 105 (e.g., any of requesting systems 105A-C), request formatting platform 110, and request processor 115 (e.g., any of request processors 115A-C. Requesting system 105 may wish to transmit a request to request processor 115 via request formatting platform 110.

Requesting system 105 transmits a request 302A to request platform 110, which is received in a common connectivity service 310. Request 302A may include an identifier of the requesting system 105. The identifier may be used by common connectivity service 310 to retrieve an initial format for the request 302A. The initial format may be specific to requesting system 105 in some embodiments. Common connectivity service 310 then parses request 302A into fields. The parsed request is provided to common request processing API 114.

Common request processing API 114 places the parsed fields into corresponding fields of a formatted request suitable for transmission to request processor 115 (although a similar format would be used for other request processors as well). Request formatting platform 110 then sends the formatted request 302B to request processor 115.

Request processor 115 may send a response to request 302B. In some embodiments, request processor 115 may generate a notification 304A regarding request 302B. Notification 304A is generated by request processor 115 according to specifications of the common request processing API 114, which is also implemented on request processor 115. In other words, notifications from a plurality of request processors would be formatted similarly, depending on the type of notification.

Notification 304A may include information regarding the status of request 302B, fulfillment of request 302B, outcome of request 302B, or any other data. When received by request formatting platform 110, common request processing API 114 may perform a reverse formatting process on notification 304A to place notification 304A in proper format for requesting system 105 (i.e., generating notification 304B) in some embodiments. The proper format for requesting system 105 may be determined by look-up using the identifier associated with requesting system 105. In other embodiments, common request processing API 114 may be omitted from processing of notification 304A and/or may simply pass notification 304A through to notification service 315 and requesting system 105 (i.e., notification 304B would be the same as notification 304A). In either embodiment, notification 304B is then passed from notification service 315 of request formatting platform 110 to requesting system 105.

Request processor 115 may also send other responses to request 302B, or may send a message without an initial request. In some embodiments, request processor 115 may generate a report 306A, either related to unrelated to request 302B. Report 306A may be generated by request processor 115 according to specifications of the common request processing API 114, which is implemented on request processor 115. In other words, reports from a plurality of request processors would be formatted similarly, depending on the type of report.

Report 306A may, for example, aggregate data regarding requests received at request processor 115 from requesting system 105. For example, report 306A may aggregate data regarding types of requests received from requesting system 105, statuses of requests received from requesting system 105, outcomes of requests received from requesting system 105, or any other data. When received by request formatting platform 110, common request processing API 114 may perform a reverse formatting process on report 306A to place report 306A in proper format for requesting system 105 (i.e., generating report 306B) in some embodiments. The proper format for requesting system 105 may be determined by look-up using the identifier associated with requesting system 105. In other embodiments, common request processing API 114 may be omitted from processing of report 306A and/or may simply pass report 306A through to reports platform 320 and requesting system 105 (i.e., report 306B would be the same as report 306A). In either embodiment, report 306B is then passed from reports platform 320 of request formatting platform 110 to requesting system 105.

Thus, request formatting platform 110 must know and apply only one common request processing API 114 for a plurality of different request processors. The common request processing API 114 may set out a common format for not only requests, but also responses, notifications, and/or reports. Request formatting platform 110 does not need to implement separate APIs for either different request processors or different types of communications.

B. Methods

Figure 4:
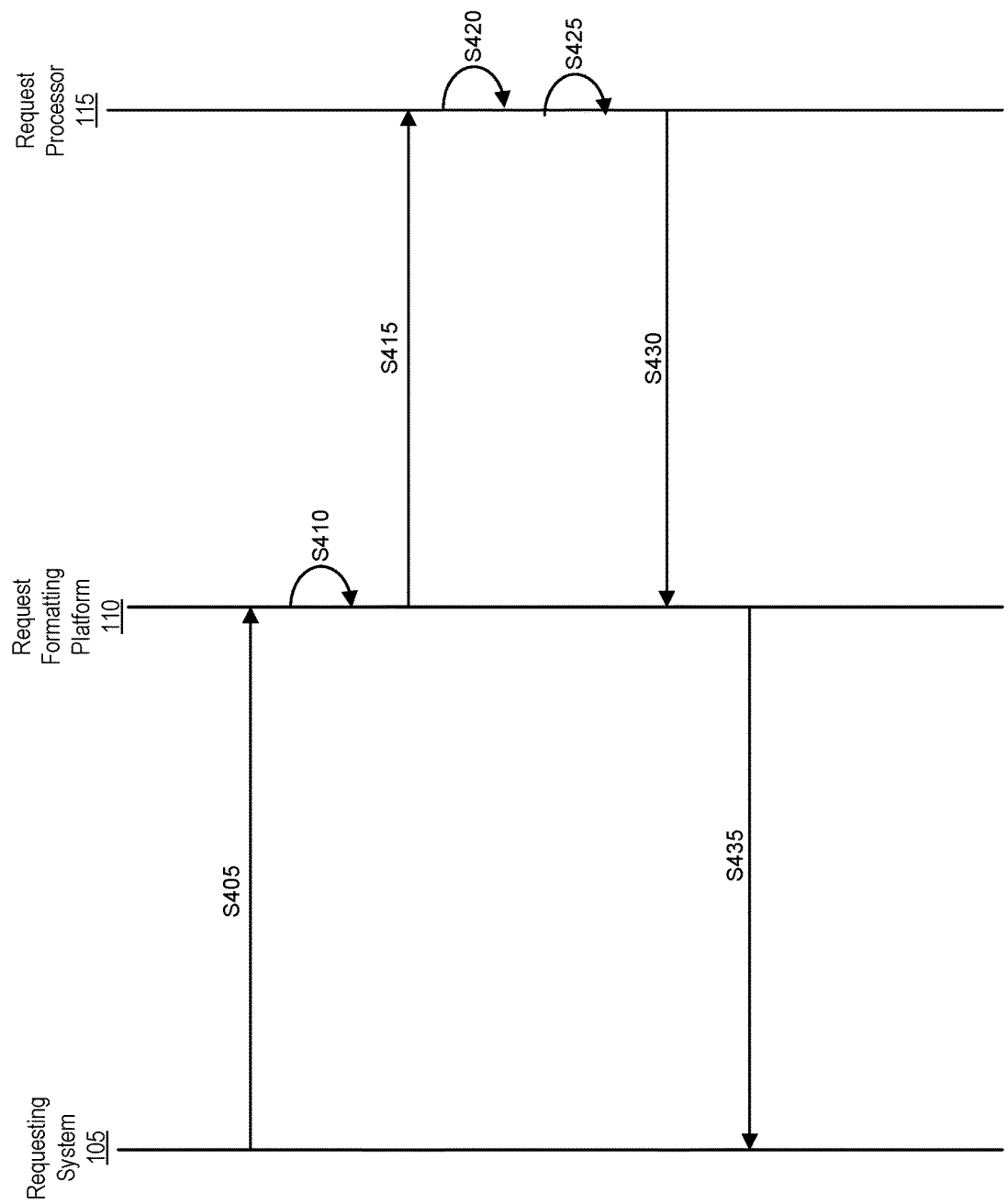
FIG. 4 shows a flow diagram depicting a method for processing requests using a common request processing API according to an embodiment of the present invention.

Various methods may be used by the above systems to implement embodiments of the invention. FIG. 4 is a flow diagram illustrating a method for processing requests using a common request processing API according to an embodiment of the present invention. FIG. 4 may be implemented with a requesting system 105, a request formatting platform 110, and a request processor 115.

At step S405, requesting system 105 sends a request to requesting formatting platform 110. The request is intended for request processor 115, as specified by the request. However, requesting system 105 may not be capable of building out directly to request processor 115, as described further herein.

At step 410, request formatting platform 110 applies the specifications of a common request processing API to the request to generate a formatted request. The common request processing API may be implemented by request formatting platform 110 and request processor 115, as well as other request processors (not shown). Thus, the formatted request has a common format regardless of the particular request processor 115 that will receive the request. However, it is contemplated that requests of different types (e.g., data requests, service requests, resource requests, access requests, etc.) may be formatted differently than each other, although similarly across request processors. For example, an access request may be formatted differently than a data request, but all access requests for all request processors may be formatted similarly to each other, and all data requests for all requests processors may be formatted similarly to each other.

At step S415, request formatting platform 110 sends the formatted request to request processor 115, as specified by the request. At step S420, request processor 115 processes the formatted request using the common request processing API. For example, request processor 115 may apply the common request processing API to the formatted request to extract fields from known locations in the request. The fields may be used by request processor 115 to process the request. The types of fields within the request and/or the fields extracted from the request may be dependent on the type of request in some embodiments. For example, a file access request may include fields for a requesting system identifier, a request processor identifier, an access level requested (e.g., read access, read/write access, etc.), a file to which access is requested, a time and date of request, a location of request, identifiers of user(s) to provide access to, and the like. In another example, a resource request may include fields for a requesting system identifier, a request processor identifier, a resource identifier, a type of resource, a cost associated with the resource, a time and date of request, a location of request, identifiers of user(s) requesting the resource, and the like. Request processor 115 may extract some or all of these fields to process the request.

At step S425, the request processor 115 generates a response to the request according to the specifications of the common request processing API. The response may be an outcome of the request (e.g., request approved, request fulfilled, request denied, an error, etc.), a fulfillment of the request (e.g., data or information responsive to the request, a security code, an activation code, etc.), and the like. The response may have a format common to a plurality of request processors, i.e., a request approval response may be formatted similarly regardless of the request processor.

At step S430, request processor 115 sends the response to the request formatting platform. At step S435, the request formatting platform 110 sends the response to requesting system 105. However, it is contemplated that the request formatting platform 110 may send the response to other entities or third parties in other embodiments. For example, in some embodiments, requesting system 105 may send a request on behalf of one or more users. In these embodiments, request formatting platform 110 may send the response directly to the user(s), instead of through requesting system 105. Examples in this respect are discussed further herein.

Figure 5:
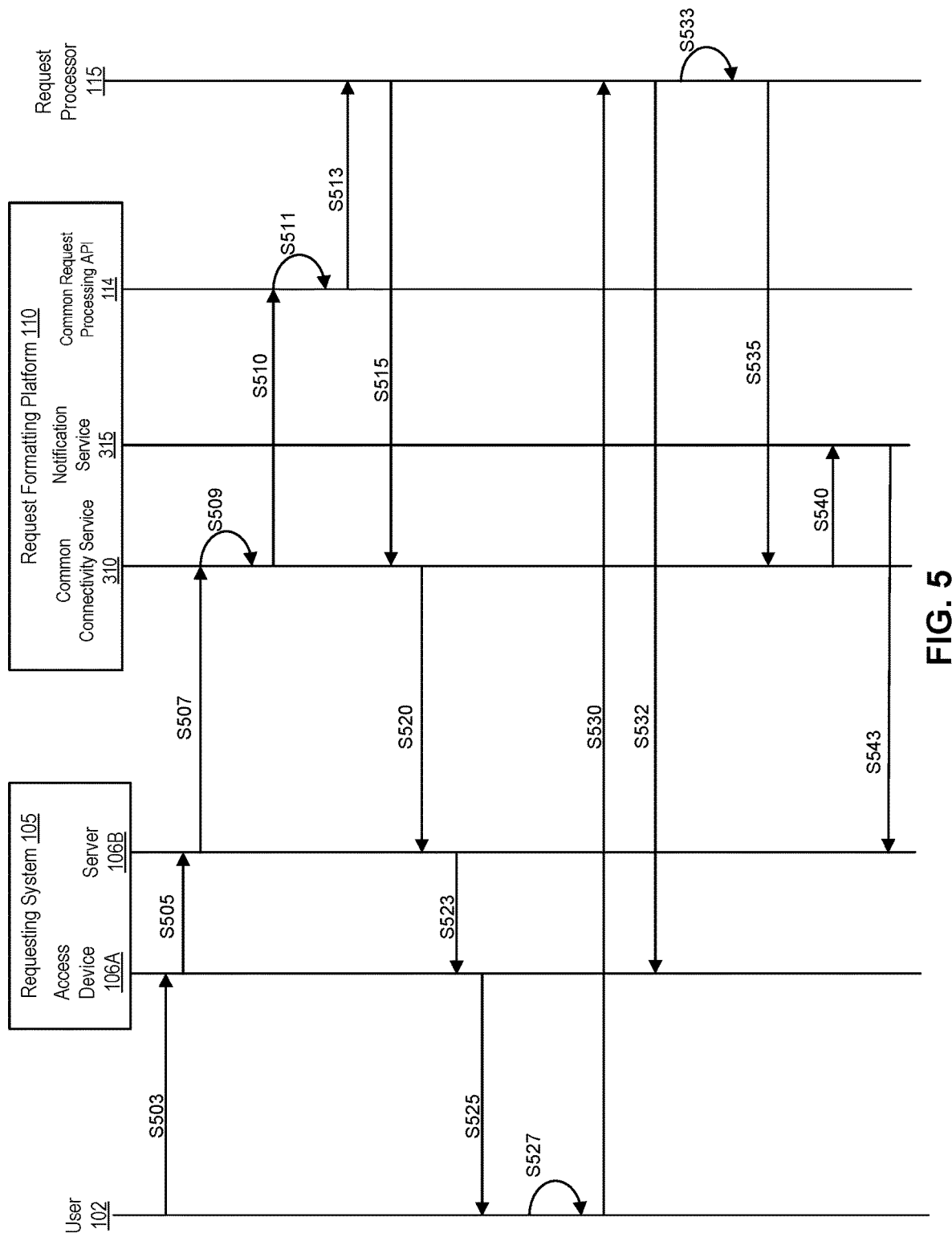
FIG. 5 shows a flow diagram depicting a method for processing requests with redirection according to an embodiment of the present invention.

In some embodiments, processing of a request by a request processor 115 may require further information than what was provided in the request. FIG. 5 shows a flow diagram depicting a method for processing requests with redirection to collect further information according to an embodiment of the present invention. According to the embodiment illustrated in FIG. 5, a requesting system 105 may be submitting a request to request formatting platform 110 on behalf of a user 102. The user 102 may make a request through an access device 106A associated with the requesting system 105 at step S503. The access device 106A may be any type of access device, such as a website providing access to data, applications or resources; a point-of-sale device providing access to assets (e.g., goods and services); a physical security device providing access to venues, locations, or buildings; and the like.

At step S505, the access device 106A forwards the request to a server 106B also associated with requesting system 105. In some embodiments, server 106B may be separate or remote from access device 106A. For example, server 106B may be centrally located with respect to requesting system 105, while access device 106A (and, in some embodiments, additional access devices) may be present virtually, at particular locations (e.g., locations more convenient to user 102), at particular venues or buildings, etc.

At step S507, server 106B forwards the request to a common connectivity service 310 of request formatting platform 110. In some embodiments, server 106B reformats the request into a particular format specific to requesting system 105 before forwarding it to interface 111. For example, server 106B may reformat the request received from the user into a format parsable by request formatting platform 110. When reformatting the request, server 106B may include a field in the request with an identifier of requesting system 105.

At step S509, common connectivity service 310 uses the identifier of requesting system 105 to retrieve an initial format for the request. The initial format may be specific to requesting system 105, as discussed further herein. Common connectivity service 310 then parses the request into fields. The parsed request is provided to common request processing API 114 at step S510.

At step S511, common request processing API 114 places the parsed fields into corresponding fields of a formatted request suitable for transmission to request processor 115 (although a similar format would be used for other request processors as well). Request formatting platform 110 then sends the formatted request to request processor 1150 at step S513.

At step S515, request processor 115 generates and sends a redirection message to common connectivity service 310. The redirection message may be generated by request processor 115 and may request that additional information or data be provided by user 102 in order to process the request. At step S520, the common connectivity service 310 sends the redirection message to server 106B. At step S523, server 106B sends the redirection message to access device 106A. At step S525, access device 102 sends the redirection message to user 102. Although shown and described as being routed through requesting system 105, however, it is contemplated that common connectivity service 310 may directly send the redirection message to user 102 in some embodiments, such as when the formatted request includes a field including a user identifier (e.g., contact information for user 102, such as an e-mail address, a phone number, an address, an IP address, etc.).

At step S527, user 102 gathers the necessary information to respond to the redirection message. At step S530, user 102 provides the information to request processor 115 either directly (as in step S530) or indirectly (i.e., through server 106B and request formatting platform 110). When provided directly to request processor 115, the information may be protected from disclosure to requesting system 105 and request formatting platform 110. Such embodiments may be desirable when the information provided in response to the redirection message is sensitive (e.g., personal information, financial information, etc.).

To provide an example, the redirection message sent to user 102 may be a URL hosted by request processor 115. At step S527, user 102 may access the URL hosted by request processor 115 and enter the requested information. At step S530, the requested information may be transmitted directly back to request processor 115 via the website associated with the URL.

At step S532, request processor 115 sends an acknowledgment of receipt of the requested information to access device 106A. In some embodiments, access device 106A may display the acknowledgment to user 102. For example, if access device 106A is a website, access device 106A may display a "thank you" message to user 102, confirming that the requested information was successfully received.

At step S533, the request is processed by request processor 115, and a response is generated. In some embodiments, the response may include an outcome of the request, fulfillment of the request, etc., as described further herein. For example, if user 102 is requesting access to a building, request processor 115 may generate a new access code, and the response may include the access code.

At step S535, request processor 115 may provide the response to common connectivity service 310. Common connectivity service 310 may provide the response to notification service 310 at step S540. At step S543, notification service 310 may send the response to server 1066 of requesting system 105. Once server 1066 receives the response, server 1066 may take one or more actions based on the notification in some embodiments. For example, server 106B may send the response to access device 106A. In some embodiments, access device 106A may display the response to user 102. In some embodiments, access device 106A may take action based on the response. For example, access device 106A may receive an access code and unlock a door, allowing user 102 access to a building. Additionally or alternatively, it is contemplated that request processor 115 may send the response directly to user 102 in some embodiments, bypassing request formatting platform 110 and/or requesting system 105 in some embodiments.

III. Examples: Transaction Processing

Figure 6:
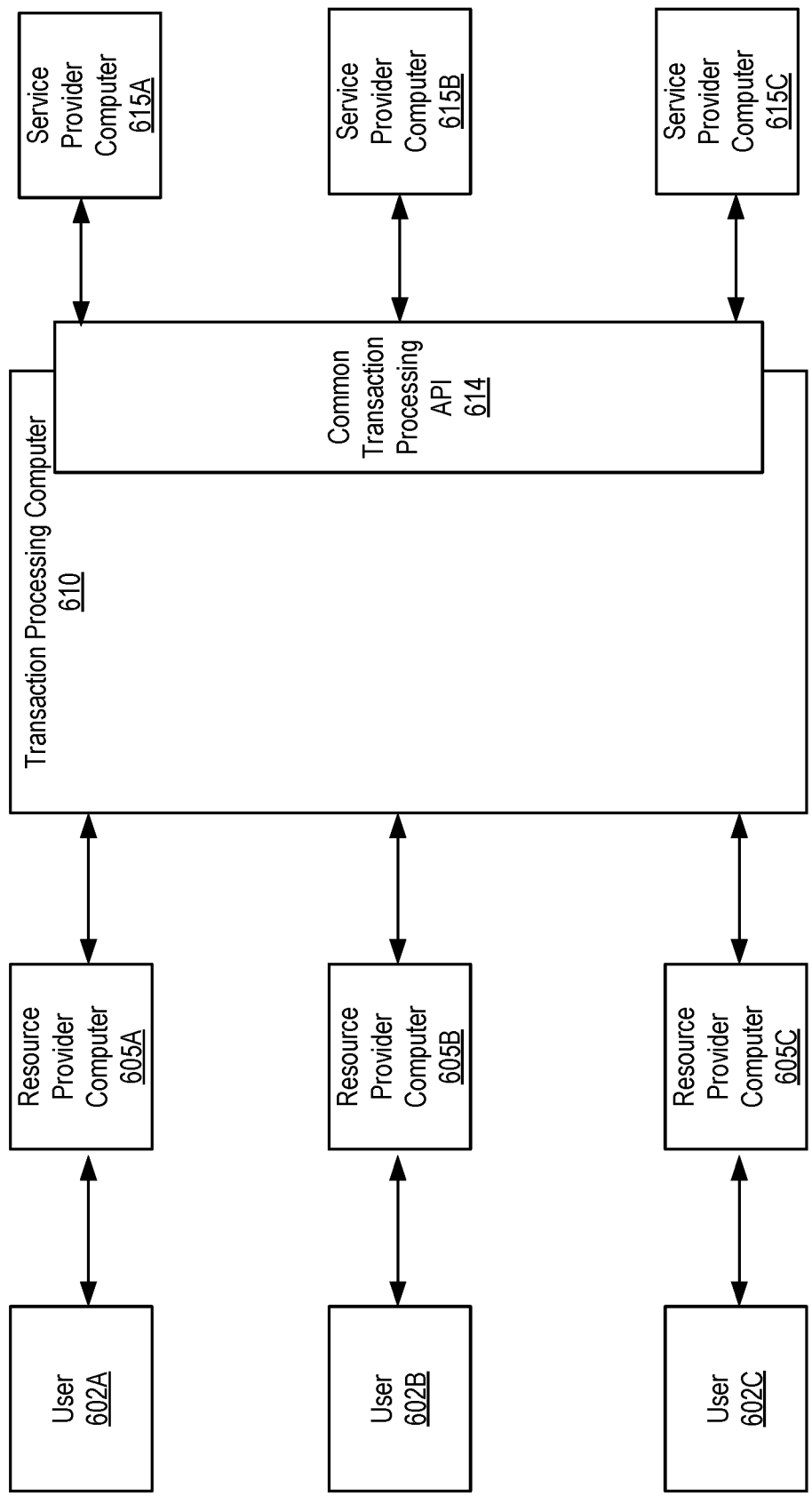
FIG. 6 shows a block diagram depicting a system for processing transaction requests using a common request processing API according to an embodiment of the present invention.

Embodiments of the invention may be used to communicate and process transaction-related requests, such as payments, captures, credits/refunds, authorization reversals, transaction status checks, chargebacks, notifications, reports and the like. FIG. 6 shows a block diagram depicting a system for processing transaction requests using a common transaction processing API 614 according to an embodiment of the invention. The system includes users 602A-C (which may be similar to user 102), resource provider computers 605A-C (which may be similar to requesting systems 105A-C), a transaction processing computer 610 (which may be similar to request formatting platform 110), a common transaction processing API 614 (which may be similar to common request processing API 114), and service provider computers 615A-C (which may be similar to request processors 115A-C). Resource provider computers 605A-C may be, for example, computers associated with different resource providers such as merchants, in one example. Service provider computers 615A-C may be, for example, computers associated with different payment service providers providing different combinations of payment services, such as payment service providers (PSPs).

Users 602A-C may wish to transact with resource providers associated with resource provider computers 605A-C. Resource provider computers 605A-C may wish to transmit the transaction requests to one or more of service provider computers 615A-C via transaction processing computer 610. The transaction requests may include identifiers of the resource provider computers 605A-C that may be used by transaction processing computer 610 to retrieve an initial format for the transaction request, as described further herein with respect to FIG. 2. Once the initial format is retrieved, the transaction request may be parsed into fields (e.g., transaction type, resource provider ID, service provider ID, transaction amount, primary account number, etc.) by transaction processing computer 610.

Transaction processing computer 610 then implements a common transaction processing API 614 to place the parsed fields into corresponding fields of a formatted request suitable for transmission to any one of service provider computers 615A-C, as described further with respect to FIG. 2. Upon receipt, service provider computers 615A-C may process the formatted request. For example, service provider computers 615A-C may process a payment request for a transaction amount from user 602A's primary account number, for example. At any time, service provider computers 615A-C may send a response to the transaction request. The response may be intended for transaction processing computer 610, resource provider computers 605A-C, and/or users 602A-C. For example, the response may be a confirmation that the transaction was processed and the outcome of the transaction. The response may also be formatted according to specifications of common transaction processing API 614, such that responses received from multiple service provider computers 615A-C have a common format.

Thus, transaction processing computer 610 must know and apply only one common transaction processing API 614 for a plurality of different service provider computers 615A-C. This allows transaction processing computer 610 to easily and quickly "scale out" to a large number of service provider computers 615A-C. Transaction processing computer 610 does not need to build individual connections to each service provider computer 615A-C.

A. Payment

One example of a transaction request that may be processed according to embodiments of the invention is a payment request. In some embodiments, payment requests may be initiated directly (e.g., by a user providing payment information to the resource provider when initiating the transaction), as described further herein with respect to FIG. 8. In some embodiments, payment requests may be initiated indirectly (e.g., by a user providing payment information directly to a service provider, bypassing the resource provider), as described further herein with respect to FIGS. 7A and 7B. Indirect payment may be useful, for example, if a user wishes to protect his or her payment details from resource providers, transaction processors, and/or other middlemen.

Figure 7A:
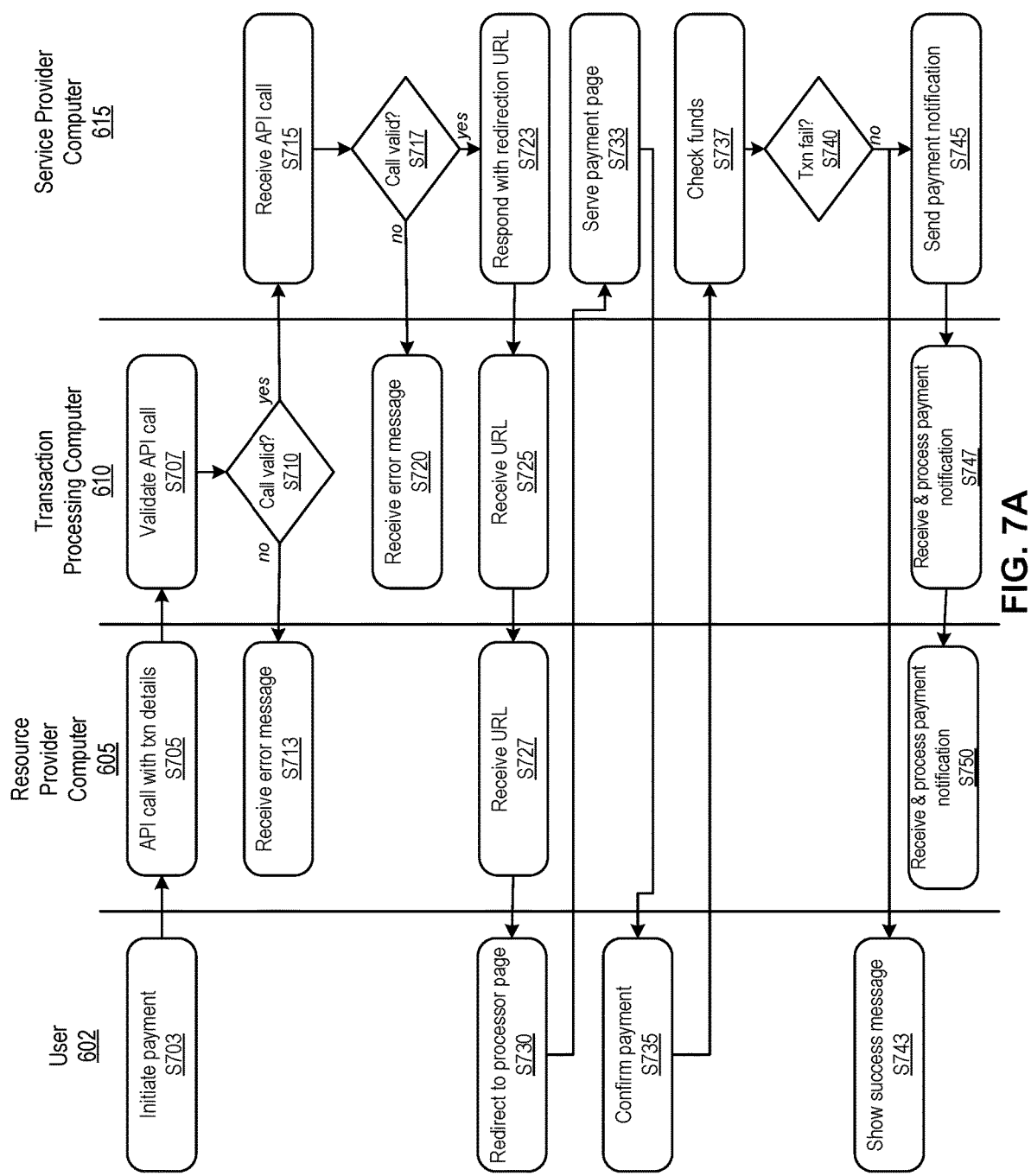
FIG. 7A shows a flow diagram depicting a method for processing successful payment requests with redirection using a common request processing API according to an embodiment of the present invention.
Figure 7B:
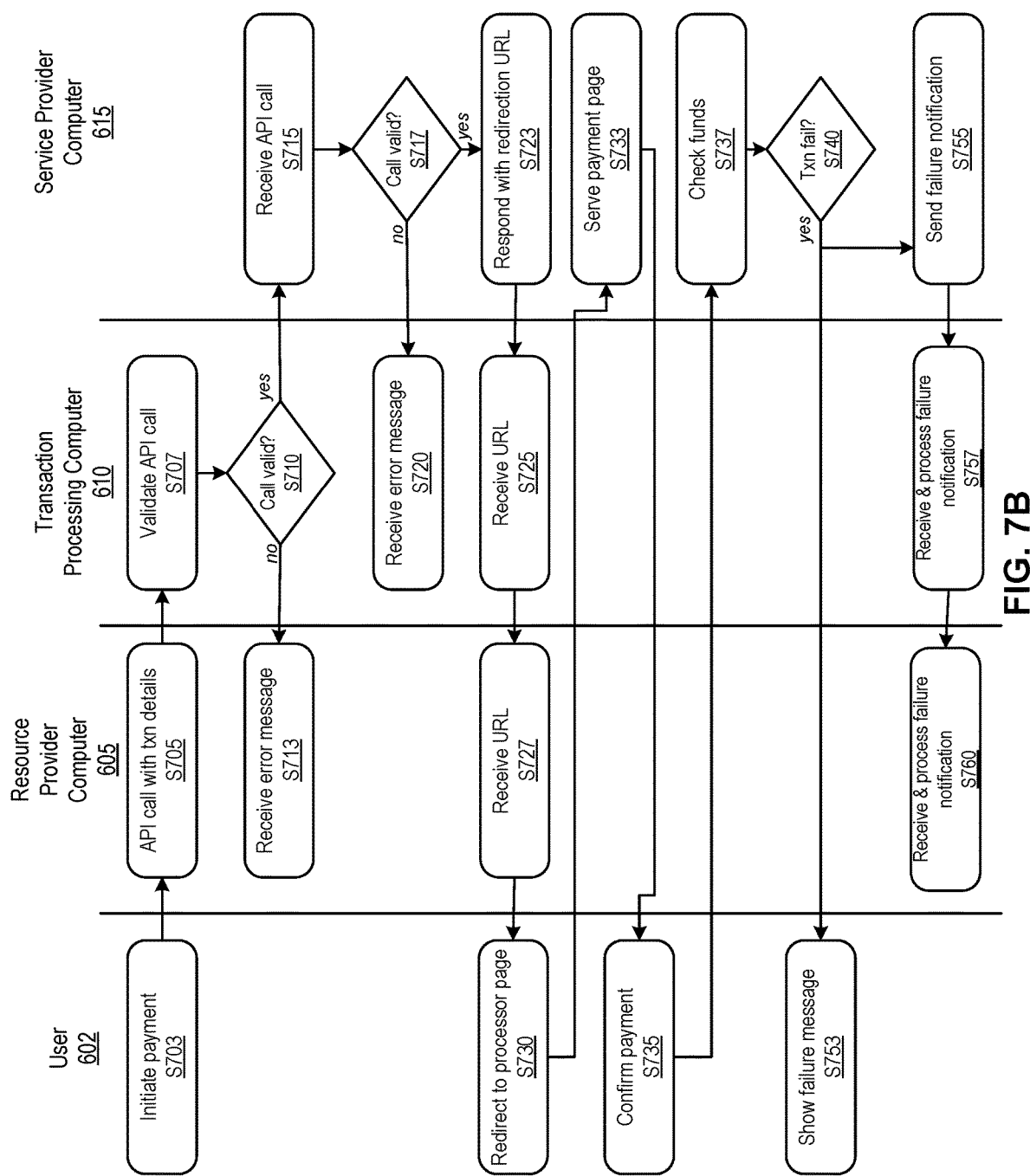
FIG. 7B shows a flow diagram depicting a method for processing unsuccessful payment requests with redirection using a common request processing API according to an embodiment of the present invention.

FIG. 7A shows a flow diagram depicting a method for processing successful payment requests with redirection using a common request processing API according to an embodiment of the present invention. FIG. 7B shows a flow diagram depicting a method for processing unsuccessful payment requests with redirection using a common request processing API according to an embodiment of the present invention. Steps S703-S740 may be the same for both FIG. 7A (successful payment request) and FIG. 7B (unsuccessful payment request). FIGS. 7A and 7B include a user 602 (which may be similar to any of users 602A-C), a resource provider computer 605 (which may be similar to any of resource providers 605A-C), a transaction processing computer 610, and a service provider computer 615 (which may be similar to any of service provider computers 615A-C).

At step S703, user 602 initiates a payment request with resource provider computer 605. For example, user 602 may click on a "pay now" button on a resource provider website. At step S705, resource provider computer 605 generates an API call with the transaction details (e.g., a resource provider ID, a service provider ID, a transaction amount, etc.), and sends it to transaction processing computer 610.

At step S707, transaction processing computer 610 validates the API call. At step S710, the transaction processing computer 610 determines whether or not the API call is valid. If the API call is not valid (e.g., one or more fields of the transaction details are missing), transaction processing computer 610 sends an error message to resource provider computer 605 at step S713. If the API call is valid, transaction processing computer 610 may format the API call according to a common transaction processing API as described further herein, and send the formatted API call to service provider computer 615 at step S715. Transaction processing computer 610 may know to which service provider computer 615 to send the formatted API call based on a service provider identifier in the transaction details.

At step S717, service provider computer 615 determines whether or not the API call is valid. If the API call is not valid (e.g., the API call is not formatted properly according to the common transaction processing API), service provider computer 615 sends an error message to transaction processing computer 610 at step S720. If the API call is valid, service provider computer 615 generates a redirection message at step S723. The redirection message may include, for example, a URL to a website hosted by service provider computer 615. At step S725, service provider computer 615 sends the redirection message to transaction processing computer 610. At step S727, transaction processing computer 610 sends the redirection message to resource provider computer 605.

At step S730, user 602 receives the redirection message from resource provider computer 605. In the case of a redirection URL, user 602 enters the URL on a computing device (or is automatically sent to the URL) and is redirected to the website associated with service provider computer 615. At step S733, service provider computer 615 serves a payment page to user 602. At step S735, user 602 enters payment details (e.g., a primary account number, a verification value, an expiration date, a username, a password, etc.) and confirms payment. At step S737, service provider computer 615 checks funds in the account provided by user 602. At step S740, it is determined whether the transaction failed (e.g., whether funds in the account provided by user 602 were not sufficient for the transaction).

According to FIG. 7A, the transaction did not fail (e.g., funds in the account provided by user 602 were sufficient for the transaction). Thus, service provider computer 615 sends a success message to user 602 at step S743. Service provider computer 615 may further generate a successful payment notification according to the common transaction processing API and send it to transaction processing computer 610 at step S745. At step S747, transaction processing computer 610 receives and processes the payment notification and sends it to resource provider computer 605. At step S750, resource provider computer 605 receives and processes the payment notification. After receiving confirmation that the payment request was successful, the resource provider associated with resource provider computer 605 may provide user 602 with the requested resource (e.g., goods, services, etc.).

According to FIG. 7B, the transaction did fail (e.g., funds in the account provided by user 602 were insufficient for the transaction). Thus, service provider computer 615 sends a failure message to user 602 at step S753. Service provider computer 615 may further generate a failed payment notification according to the common transaction processing API and send it to transaction processing computer 610 at step S755. At step S757, transaction processing computer 610 receives and processes the failed payment notification and sends it to resource provider computer 605. At step S760, resource provider computer 605 receives and processes the failed payment notification. After receiving notification that the payment request was unsuccessful, the resource provider associated with resource provider computer 605 may not provide user 602 with the requested resource, or may request a different payment option.

In some embodiments, the failed payment notification and/or successful payment notification may be formatted by service provider computer 615 according to the common transaction processing API, such that all payment notifications received by transaction processing computer 610 have a similar format, regardless of the particular service provider computer 615.

Figure 8:
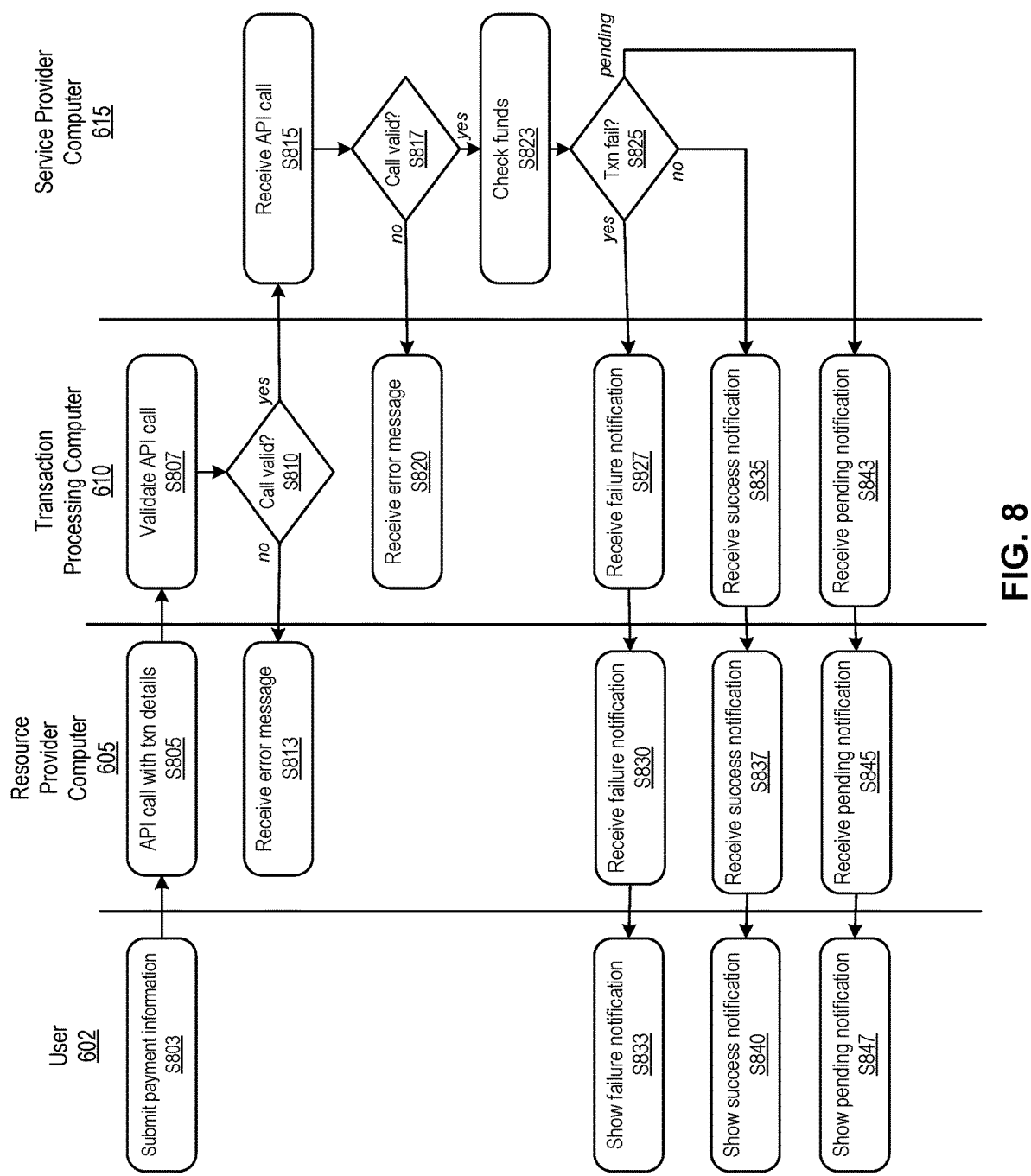
FIG. 8 shows a flow diagram depicting a method for processing payment requests without redirection according to an embodiment of the present invention.

FIG. 8 shows a flow diagram depicting a method for processing payment requests directly (i.e., without redirection) according to an embodiment of the present invention. FIG. 8 includes a user 602 (which may be similar to any of users 602A-C), a resource provider computer 605 (which may be similar to any of resource providers 605A-C), a transaction processing computer 610, and a service provider computer 615 (which may be similar to any of service provider computers 615A-C).

At step S803, user 602 initiates a payment request with resource provider computer 605. For example, user 602 may click on a "pay now" button on a resource provider website. In this embodiment, user 602 may provide payment details (e.g., primary account number, expiration date, verification value, username, password, PIN, etc.) along with the payment request. At step S805, resource provider computer 605 generates an API call with the transaction details (e.g., a resource provider ID, a service provider ID, a transaction amount, payment details, etc.), and sends it to transaction processing computer 610.

At step S807, transaction processing computer 610 validates the API call at step S707. At step S810, the transaction processing computer 610 determines whether or not the API call is valid. If the API call is not valid (e.g., one or more fields of the transaction details are missing), transaction processing computer 610 sends an error message to resource provider computer 605 at step S813. If the API call is valid, transaction processing computer 610 may format the API call according to a common transaction processing API as described further herein, and send the formatted API call to service provider computer 615 at step S815. Transaction processing computer 610 may know to which service provider computer 615 to send the formatted API call based on a service provider identifier in the transaction details.

At step S817, service provider computer 615 determines whether or not the API call is valid. If the API call is not valid (e.g., the API call is not formatted properly according to the common transaction processing API), service provider computer 615 sends an error message to transaction processing computer 610 at step S820. If the API call is valid, service provider computer 615 checks funds in the account provided by user 602 at step S823. At step S825, it is determined whether the transaction failed (e.g., whether funds in the account provided by user 602 were not sufficient for the transaction).

If the transaction failed, service provider computer 615 generates a failed payment notification according to the common transaction processing API and sends it to transaction processing computer 610 at step S827. At step S830, transaction processing computer 610 receives and processes the failed payment notification and sends it to resource provider computer 605. At step S833, resource provider computer 605 receives and processes the failed payment notification and sends it to user 602. After receiving notification that the payment request was unsuccessful, the resource provider associated with resource provider computer 605 may not provide user 602 with the requested resource, and/or user 602 may select a different payment option.

If the transaction did not fail, service provider computer 615 generates a successful payment notification according to the common transaction processing API and sends it to transaction processing computer 610 at step S835. At step S837, transaction processing computer 610 receives and processes the successful payment notification and sends it to resource provider computer 605. At step S840, resource provider computer 605 receives and processes the successful payment notification and sends it to user 602. After receiving notification that the payment request was successful, the resource provider associated with resource provider computer 605 may provide user 602 with the requested resource (e.g., goods, services, etc.).

If the transaction has not yet been processed (i.e., it is pending due to a delay, for example), service provider computer 615 generates a pending payment notification according to the common transaction processing API and sends it to transaction processing computer 610 at step S843. At step S845, transaction processing computer 610 receives and processes the pending payment notification and sends it to resource provider computer 605. At step S847, resource provider computer 605 receives and processes the pending payment notification and sends it to user 602. After receiving notification that the payment request is still pending, the resource provider associated with resource provider computer 605 may continue to wait for a failed or successful payment notification before deciding whether to provide user 602 with the requested resource, may cancel and reprocess the transaction, and/or may request that user 602 select a different payment option.

In some embodiments, the failed payment notification, successful payment notification and/or the pending payment notification may be formatted by service provider computer 615 according to the common transaction processing API, such that all payment notifications received by transaction processing computer 610 have a similar format, regardless of the particular service provider computer 615.

B. Capture

Another example of a transaction request that may be processed according to embodiments of the invention is a capture request. A capture request may require a follow-on API call to capture an already authorized payment, such as a payment authorized as described above with respect to FIGS. 7A-B and 8. A capture request may be made for full or partial transaction amounts. In some embodiments, it is the responsibility of the service provider to keep a log of the total captures processed and respond with an error for invalid capture requests.

Figure 9:
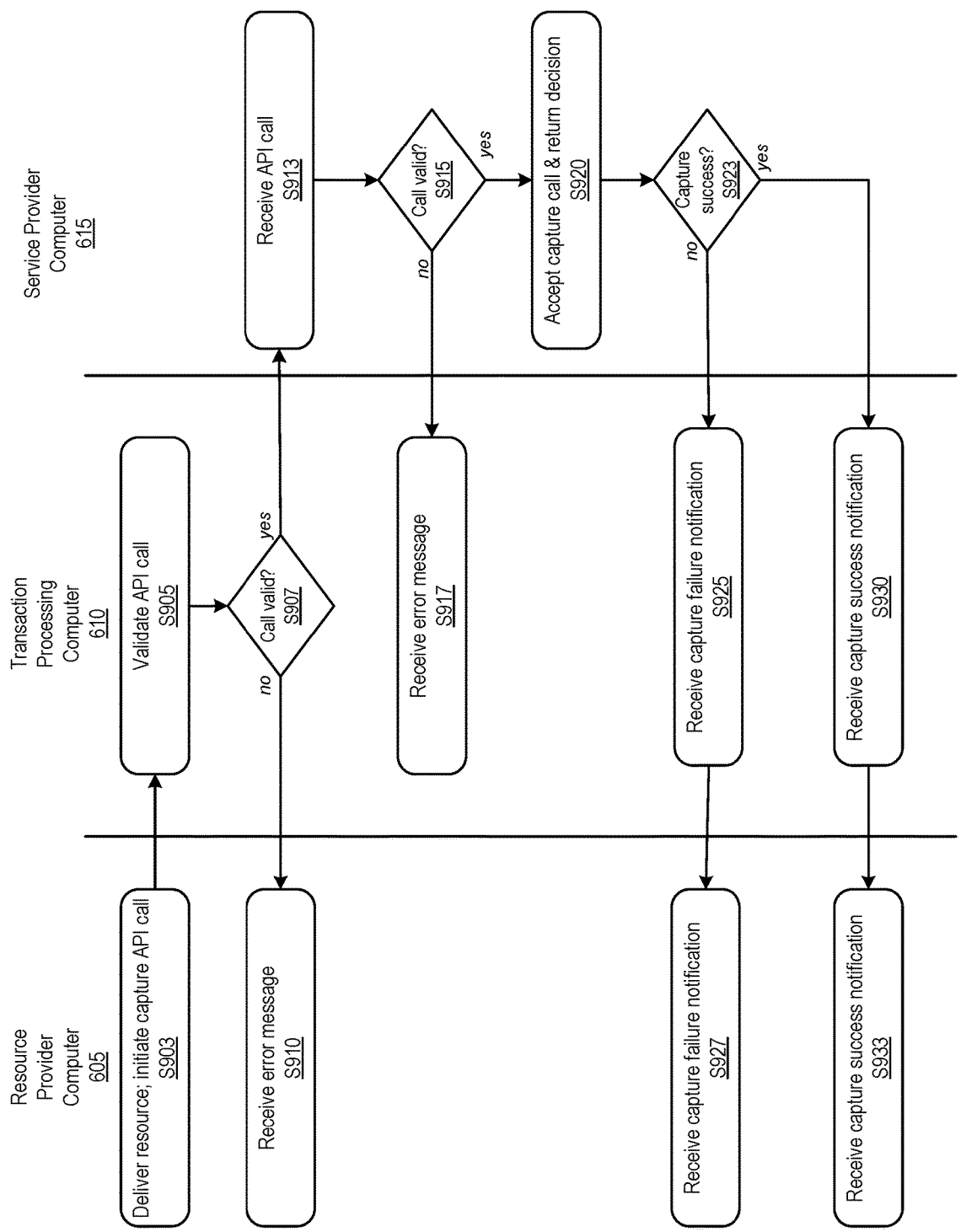
FIG. 9 shows a flow diagram depicting a method for processing capture requests according to an embodiment of the invention.

FIG. 9 shows a flow diagram depicting a method for processing capture requests according to an embodiment of the invention. FIG. 9 includes a resource provider computer 605 (which may be similar to any of resource providers 605A-C), a transaction processing computer 610, and a service provider computer 615 (which may be similar to any of service provider computers 615A-C). At step S903, resource provider computer 605 delivers a previously purchased resource (e.g., shipping goods to a user). Resource provider computer 605 then generates a capture API call (for either the full or partial amount). The capture API call may be generated in a format specific to resource provider computer 605 and known to transaction processing computer 610, for example, as described further herein.

At step S905, transaction processing computer 610 receives the API call and validates the API call. At step S907, transaction processing computer 610 determines whether the API call is valid (e.g., the API call includes the necessary fields to generate a formatted API call). If the API call is not valid, transaction processing computer 610 returns an error message to resource provider computer 605 at step S910. If the API call is valid, transaction processing computer 610 reformats the API call according to a common transaction request processing API, and sends the formatted API call to service provider computer 615 at step S913.

At step S915, service provider computer 615 determines whether the formatted API call is valid (e.g., the formatted API call includes the fields necessary to process the capture request). If the formatted API call is not valid, service provider computer 615 sends an error message to transaction processing computer 610 at step S917. If the formatted API call is valid, service provider computer 615 accepts the API call and makes a decision on the capture at step S920.

At step S923, service provider computer 615 determines whether the capture is successful. If the capture is unsuccessful, service provider computer 615 sends a capture failure notification to transaction processing computer 610 at step S925. The capture failure notification may include a reason code. At step S927, transaction processing computer 610 sends the capture notification message to resource provider computer 605.

If the capture is successful, service provider computer 615 sends a capture success notification to transaction processing computer 610 at step S930. At step S933, transaction processing computer 610 sends the capture success notification to resource provider computer 605. In some embodiments, the capture failure notification and/or the capture success notification may be formatted by service provider computer 615 according to the common transaction processing API, such that all capture responses received by transaction processing computer 610 have a similar format, regardless of the particular service provider computer 615.

C. Credit/Refund

Another example of a transaction request that may be processed according to embodiments of the invention is a credit/refund request. A credit/refund request may require a follow-on API call to refund an already authorized payment, such as a payment authorized as described above with respect to FIGS. 7A-B and 8, and/or a captured payment, such as is described above with respect to FIG. 9. A credit/refund request may be made for full or partial transaction amounts. In some embodiments, it is the responsibility of the service provider to keep a log of the total refund amount(s) processed and respond with an error for invalid refund requests.

Figure 10:
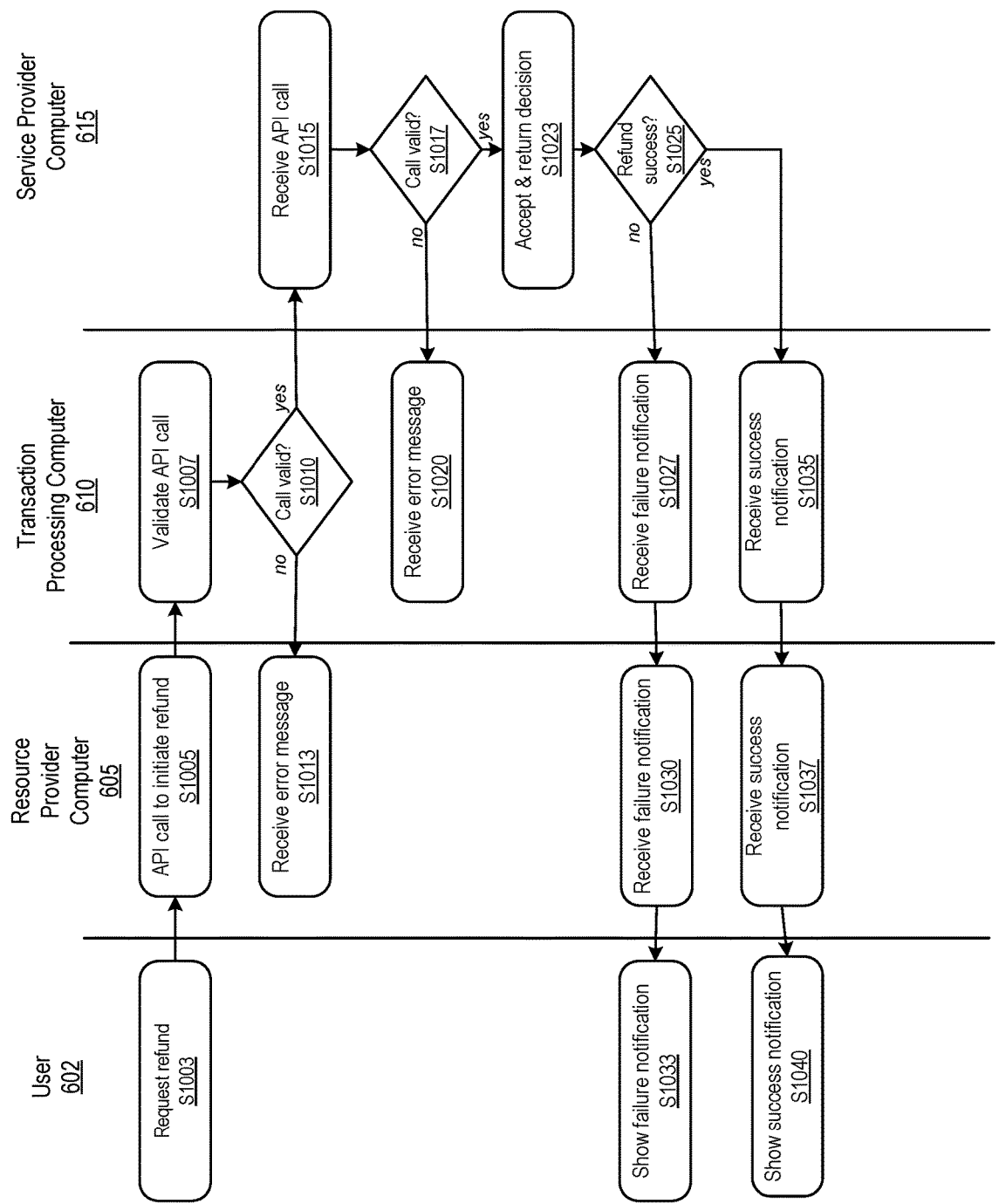
FIG. 10 shows a flow diagram depicting a method for processing credit/refund requests according to an embodiment of the invention.

FIG. 10 shows a flow diagram depicting a method for processing credit/refund requests according to an embodiment of the invention. FIG. 10 includes user 602 (which may be similar to any of users 602A-C), a resource provider computer 605 (which may be similar to any of resource providers 605A-C), a transaction processing computer 610, and a service provider computer 615 (which may be similar to any of service provider computers 615A-C). At step S1003, user 602 requests a refund of a paid and settled transaction from resource provider computer 605. At step S1005, resource provider computer 605 generates an API call using its own format to initiate a refund (either partial or full), and sends the API call to transaction processing computer 610.

At step S1007, transaction processing computer 610 validates the API call, and determines whether the API call is valid at step S1010. If the API call is not valid (e.g., one or more fields needed of the refund request are missing), transaction processing computer 610 sends an error message to resource provider computer 605 at step S1013. If the API call is valid, transaction processing computer 610 may format the API call according to a common transaction processing API as described further herein, and send the formatted API call to service provider computer 615 at step S1015. Transaction processing computer 610 may know to which service provider computer 615 to send the formatted API call based on a service provider identifier in the refund request.

At step S1017, service provider computer 615 determines whether or not the API call is valid. If the API call is not valid (e.g., the API call is not formatted properly according to the common transaction processing API), service provider computer 615 sends an error message to transaction processing computer 610 at step S1020. If the API call is valid, service provider computer 615 accepts the refund request and makes a decision at step S1023. At step S1025, it is determined whether the refund is successful.

If the refund failed, service provider computer 615 generates a failed refund notification according to the common transaction processing API and sends it to transaction processing computer 610 at step S1027. At step S1030, transaction processing computer 610 receives and processes the failed refund notification and sends it to resource provider computer 605. At step S1033, resource provider computer 605 receives and processes the failed refund notification and sends it to user 602. After receiving notification that the refund request was unsuccessful, the resource provider associated with resource provider computer 605 may submit another refund request or request user 602 according to a different method (e.g., in cash).

If the refund is successful, service provider computer 615 generates a successful refund notification according to the common transaction processing API and sends it to transaction processing computer 610 at step S1035. At step S1037, transaction processing computer 610 receives and processes the successful refund notification and sends it to resource provider computer 605. At step S1040, resource provider computer 605 receives and processes the successful refund notification and sends it to user 602. After receiving notification that the refund request was successful, the resource provider associated with resource provider computer 605 may provide user 602 with a receipt, for example.

In some embodiments, the failed refund notification and/or successful refund notification may be formatted by service provider computer 615 according to the common transaction processing API, such that all refund notifications received by transaction processing computer 610 have a similar format, regardless of the particular service provider computer 615.

D. Authorization Reversal

Another example of a transaction request that may be processed according to embodiments of the invention is an authorization reversal request. An authorization reversal request may require a follow-on API call to cancel an authorization. An authorization reversal request may only be made for the full authorization amount in some embodiments. In some embodiments, it is the responsibility of the service provider to keep a log of the payment status and respond with an error for invalid requests (e.g., requests for reversal of captured authorizations).

Figure 11:
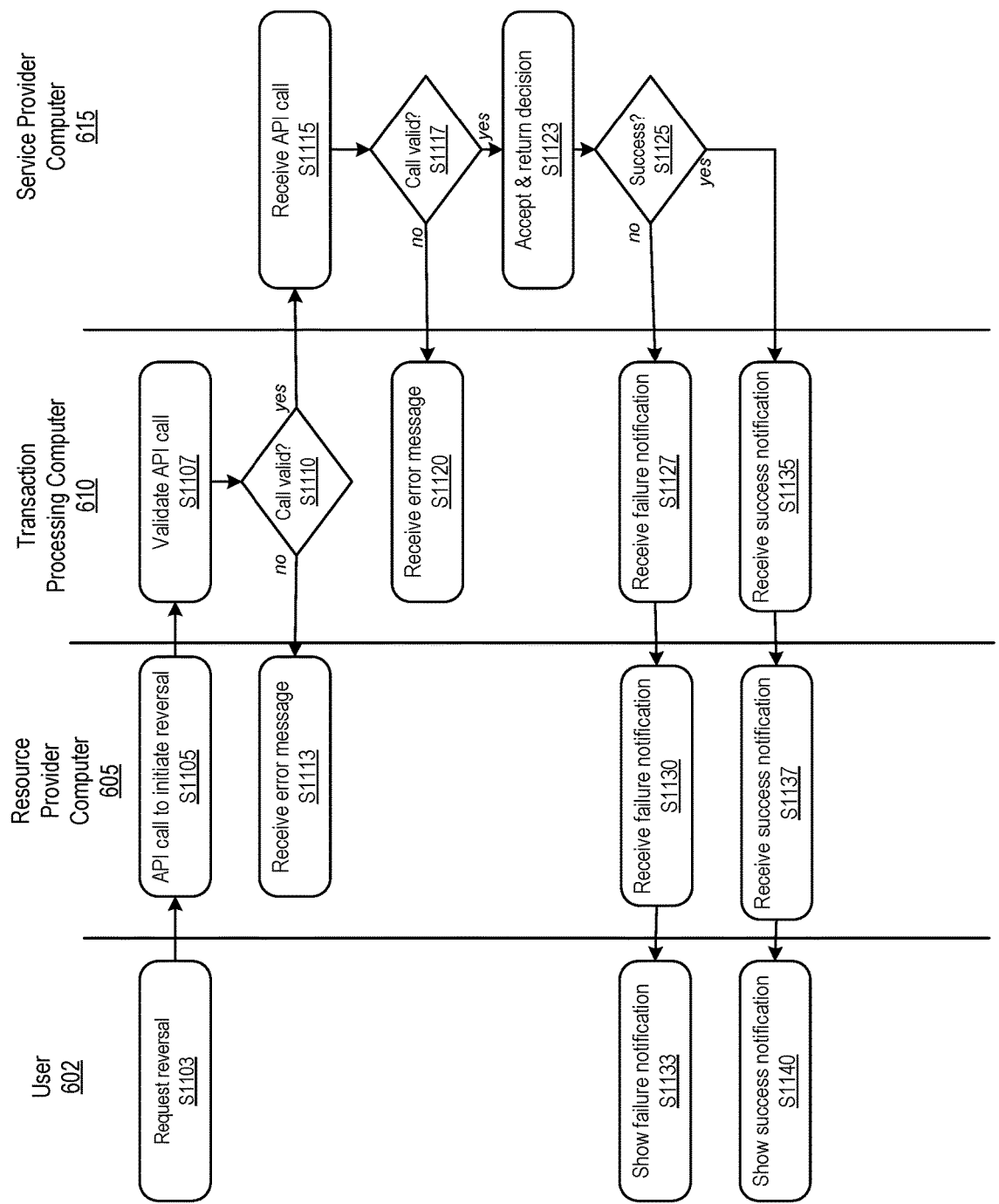
FIG. 11 shows a flow diagram depicting a method for processing authorization reversal requests according to an embodiment of the invention.

FIG. 11 shows a flow diagram depicting a method for processing authorization reversal requests according to an embodiment of the invention. FIG. 11 includes user 602 (which may be similar to any of users 602A-C), a resource provider computer 605 (which may be similar to any of resource providers 605A-C), a transaction processing computer 610, and a service provider computer 615 (which may be similar to any of service provider computers 615A-C). At step S1103, user 602 requests reversal of an authorization from resource provider computer 605. At step S1105, resource provider computer 605 generates an API call using its own format to initiate a reversal, and sends the API call to transaction processing computer 610.

At step S1107, transaction processing computer 610 validates the API call, and determines whether the API call is valid at step S1110. If the API call is not valid (e.g., one or more fields needed of the reversal request are missing), transaction processing computer 610 sends an error message to resource provider computer 605 at step S1113. If the API call is valid, transaction processing computer 610 may format the API call according to a common transaction processing API as described further herein, and send the formatted API call to service provider computer 615 at step S1115. Transaction processing computer 610 may know to which service provider computer 615 to send the formatted API call based on a service provider identifier in the reversal request.

At step S1117, service provider computer 615 determines whether or not the API call is valid. If the API call is not valid (e.g., the API call is not formatted properly according to the common transaction processing API), service provider computer 615 sends an error message to transaction processing computer 610 at step S1120. If the API call is valid, service provider computer 615 accepts the reversal request and makes a decision at step S1123. At step S1125, it is determined whether the reversal is successful.

If the reversal failed, service provider computer 615 generates a failed reversal notification according to the common transaction processing API and sends it to transaction processing computer 610 at step S1127. At step S1130, transaction processing computer 610 receives and processes the failed reversal notification and sends it to resource provider computer 605. At step S1133, resource provider computer 605 receives and processes the failed reversal notification and sends it to user 602.

If the reversal is successful, service provider computer 615 generates a successful reversal notification according to the common transaction processing API and sends it to transaction processing computer 610 at step S1135. At step S1137, transaction processing computer 610 receives and processes the successful reversal notification and sends it to resource provider computer 605. At step S1140, resource provider computer 605 receives and processes the successful reversal notification and sends it to user 602.

In some embodiments, the failed reversal notification and/or successful reversal notification may be formatted by service provider computer 615 according to the common transaction processing API, such that all reversal notifications received by transaction processing computer 610 have a similar format, regardless of the particular service provider computer 615.

E. Transaction Status Check

Figure 12:
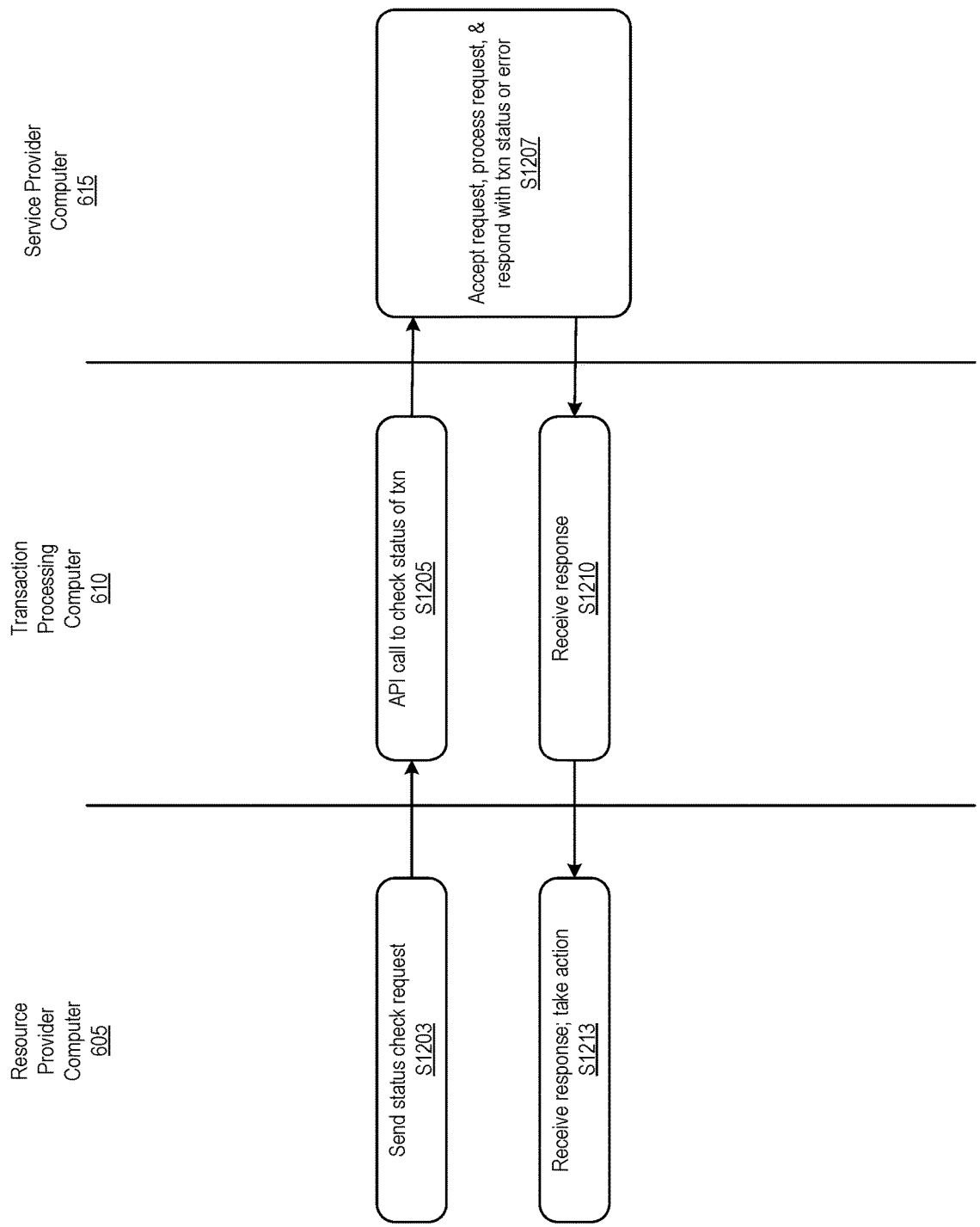
FIG. 12 shows a flow diagram depicting a method for processing transaction status check requests according to an embodiment of the invention.

Another example of a transaction request that may be processed according to embodiments of the invention is a transaction status check. A transaction status check request may fetch the latest transaction status of a previously completed transaction (e.g., a sale payment or authorization request for an asynchronous payment flow or a synchronous payment flow where a response is not received). FIG. 12 shows a flow diagram depicting a method for processing transaction status check requests according to an embodiment of the invention. FIG. 12 includes a resource provider computer 605 (which may be similar to any of resource providers 605A-C), a transaction processing computer 610, and a service provider computer 615 (which may be similar to any of service provider computers 615A-C).

At step S1203, resource provider computer 605 sends a status check request for a transaction in its own format to transaction processing computer 610. At step S1205, transaction processing computer 610 generates an API call using the common transaction processing API to check the status of the transaction, and sends the formatted API call to service provider computer 615. At step S1207, service provider computer 615 accepts and processes the API call and generates a response with the transaction status or an error. The response may be generated using the common transaction processing API. At step S1210, service provider computer 615 sends the response to transaction processing computer 610.

At step S1213, transaction processing computer 610 sends the response to resource provider computer 605. Resource provider computer 605 may then take an appropriate action based on the transaction status. For example, if an error response is received, resource provider computer 605 may resubmit the transaction status check request. In another example, if a response indicates that the transaction has been processed and approved, the resource provider associated with resource provider computer 605 may deliver the resource to user 602.

F. Reports

Embodiments of the invention may also be used to communicate reports from service providers, such as reconciliation reports, funding detail reports, deposit reports, fee detail reports, and dispute reports in a common format. Providing a consistent, standardized report solution across all service providers increases the velocity of resource providers to enable new service providers and payment types. Further, standard reports from service providers enables transaction processors to receive post-settlement data from service providers in a standard format by defining a standard integration interface.

One example of a report that may be formatted according to the common transaction processing API is a reconciliation report. A reconciliation report provides information on all of the settlement and capture requests received from a transaction processor on the previous day, and indicates whether the settlement request was accepted or rejected. This report enables resource providers to reconcile the settlements with the record of the service providers. In some embodiments, the reconciliation report is a transaction-level detailed file.

Another example of a report that may be formatted according to the common transaction processing API is a funding detail report. A funding detail report provides information on the funding, e.g., funding date, amount, currency, currency conversion information, etc. The funding detail report made be a transaction-level detailed file enabling a resource provider to reconcile funding data to a deposit transferred to the resource provider's bank account.

Still another example of a report that may be formatted according to the common transaction processing API is a deposit report. A deposit report provides information about funds deposited and withdrawn from a resource provider's bank account. A deposit report may also break down settlement activity, fees, interchange and assessment, chargeback activity, reserves, etc. In some embodiments, the deposit report may be a summary file with deposit information.

Another example of a report that may be formatted according to the common transaction processing API is a fee detail report. A fee detail report may provide information on the fees that a resource provider is charged for transactions. The fee information may include discounts, service fees, interchange amounts, assessment amounts, and the like. In some embodiments, the fee detail report may be a transaction-level detailed file.

Another example of a report that may be formatted according to the common transaction processing API is a dispute report. A dispute report may provide information on the disputes initiated by a user with an issuer (e.g., a bank issuing an account) regarding transactions handled by the resource provider. In some embodiments, the dispute report is a transaction-level detailed file.

IV. Example Computer Systems

The various participants and elements described herein may operate one or more computer apparatuses to facilitate the functions described herein. Any of the elements in the above-described figures, including any servers or databases, may use any suitable number of subsystems to facilitate the functions described herein.

Such subsystems or components are interconnected via a system bus. Subsystems may include a printer, keyboard, fixed disk (or other memory comprising computer readable media), monitor, which is coupled to display adapter, and others. Peripherals and input/output (I/O) devices, which couple to an I/O controller (which can be a processor or other suitable controller), can be connected to the computer system by any number of means known in the art. For example, an external interface can be used to connect the computer apparatus to a wide area network such as the Internet, a mouse input device, or a scanner. The interconnection via the system bus allows the central processor to communicate with each subsystem and to control the execution of instructions from system memory or the fixed disk, as well as the exchange of information between subsystems. The system memory and/or the fixed disk may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A computer system, comprising:
a processor; and
a memory coupled with the processor, the memory storing instructions which, when executed with the processor, cause the computer system to perform operations including:
receiving a plurality of transaction requests, each transaction request of the plurality of transaction requests having a different format;
formatting the plurality of transaction requests into a plurality of commonly formatted transaction, wherein formatting the plurality of transaction requests into a plurality of commonly formatted transaction requests comprises:
extracting, by the computer system, a first identifier of a first requesting system of a plurality of requesting systems from a first transaction request of the plurality of transaction requests;
retrieving, by the computer system, a first transaction request format specification for the first transaction request using the first identifier, wherein the first transaction request format specification identifies a plurality of first fields in the first transaction request; and
mapping, by the computer system, the plurality of the first fields to a plurality of commonly formatted fields, thereby generating a first commonly formatted transaction request of the plurality of commonly formatted transaction requests; and
sending each commonly formatted transaction request of the plurality of commonly formatted transaction requests to a corresponding transaction processor of a plurality of transaction processors.

2. A computer system in accordance with claim 1, wherein the transaction processor generates a response comprising data responsive to the commonly formatted transaction request.

3. A computer system in accordance with claim 2, wherein each transaction request is received from a respective requesting system of the plurality of requesting systems and the response is sent by the computer system to the respective requesting system.

4. A computer system in accordance with claim 2, wherein the response comprises a processing outcome for the corresponding transaction request.

5. A computer system in accordance with claim 2, wherein a transaction request of the plurality of transaction requests is generated by the respective requesting system in response to a user initiating a transaction with the respective requesting system, and wherein the transaction request comprises a resource request from the user to the respective requesting system.

6. A computer system in accordance with claim 5, wherein each transaction request of the plurality of transaction requests is specified for a respective transaction processor of the plurality of transaction processors, and the response to the transaction request comprises a redirection message that is sent by the computer system to the user, and wherein the redirection message redirects the user to a data collection page associated with the respective transaction processor.

7. A computer system in accordance with claim 1, wherein the plurality of requesting systems comprise resource providers.

8. A computer system in accordance with claim 1, wherein the first transaction request format specification identifies a location and a type for each field of the plurality of the first fields in the first transaction request.

9. A computer system in accordance with claim 1, wherein the instructions when executed with the processor further cause the computer system to perform operations including:
extracting, by the computer system, a second identifier of a second requesting system of the plurality of requesting systems from a second transaction request of the plurality of transaction requests;

retrieving, by the computer system, a second transaction request format specification for the second transaction request using the second identifier, wherein the second transaction request format specification identifies a plurality of second fields in the second transaction request, and wherein the second transaction request format specification is different than the first transaction request format specification; and mapping, by the computer system, the plurality of second fields to the plurality of commonly formatted fields, thereby generating a second commonly formatted transaction request of the plurality of commonly formatted transaction requests.

10. A method comprising:

receiving, with a computer system, a plurality of transaction requests, each transaction request of the plurality of transaction requests having a different format;

formatting, with the computer system, the plurality of transaction requests into a plurality of commonly formatted transaction requests at least in part by:

extracting, with the computer system, a first identifier of a first requesting system of a plurality of requesting systems from a first transaction request of the plurality of transaction requests;

retrieving, with the computer system, a first transaction request format specification for the first transaction request using the first identifier, wherein the first transaction request format specification identifies a plurality of first fields in the first transaction request; and mapping, with the computer system, the plurality of the first fields to a plurality of commonly formatted fields, thereby generating a first commonly formatted transaction request of the plurality of commonly formatted transaction requests; and sending, with the computer system, each commonly formatted transaction request of the plurality of commonly formatted transaction requests to a corresponding transaction processor of a plurality of transaction processors.

11. A method in accordance with claim 10, wherein the transaction processor generates a response comprising data responsive to the commonly formatted transaction request.

12. A method in accordance with claim 11, wherein each transaction request is received from a respective requesting system of the plurality of requesting systems and the response is sent by the computer system to the respective requesting system.

13. A method in accordance with claim 12, wherein a transaction request of the plurality of transaction requests is generated by the respective requesting system in response to a user initiating a transaction with the respective requesting system, and wherein the transaction request comprises a resource request from the user to the respective requesting system.

14. A method in accordance with claim 13, wherein each transaction request of the plurality of transaction requests is specified for a respective transaction processor of the plurality of transaction processors, and the response to the transaction request comprises a redirection message that is sent by the computer system to the user, and wherein the redirection message redirects the user to a data collection page associated with the respective transaction processor.

15. A method in accordance with claim 11, wherein the response comprises a processing outcome for the corresponding transaction request.

16. A method in accordance with claim 10, wherein the plurality of requesting systems comprise resource providers.

17. A method in accordance with claim 10, wherein the first transaction request format specification identifies a location and a type for each field of the plurality of the first fields in the first transaction request.

18. A method in accordance with claim 10, further comprising:

extracting, with the computer system, a second identifier of a second requesting system of the plurality of requesting systems from a second transaction request of the plurality of transaction requests;

retrieving, with the computer system, a second transaction request format specification for the second transaction request using the second identifier, wherein the second transaction request format specification identifies a plurality of second fields in the second transaction request, and wherein the second transaction request format specification is different than the first transaction request format specification; and mapping, with the computer system, the plurality of second fields to the plurality of commonly formatted fields, thereby generating a second commonly formatted transaction request of the plurality of commonly formatted transaction requests.

19. One or more non-transitory computer-readable media collectively having thereon computer-executable instructions that, when executed with a computer system, cause the computer system to, at least:

receive a plurality of transaction requests, each transaction request of the plurality of transaction requests having a different format;

format the plurality of transaction requests into a plurality of commonly formatted transaction, wherein formatting the plurality of transaction requests comprises:

extracting a first identifier of a first requesting system of a plurality of requesting systems from a first transaction request of the plurality of transaction requests;

retrieving a first transaction request format specification for the first transaction request using the first identifier, wherein the first transaction request format specification identifies a plurality of first fields in the first transaction request; and mapping the plurality of the first fields to a plurality of commonly formatted fields, thereby generating a first commonly formatted transaction request of the plurality of commonly formatted transaction requests; and send each commonly formatted transaction request of the plurality of commonly formatted transaction requests to a corresponding transaction processor of a plurality of transaction processors.

20. One or more non-transitory computer-readable media in accordance with claim 19, wherein the computer system receives a plurality of responses from the plurality of transaction processors, each response of the plurality of responses having a common transaction response format.

* * * * *